United States Patent
Nonaka et al.

(10) Patent No.: US 6,493,210 B2
(45) Date of Patent: Dec. 10, 2002

(54) ELECTRODE METAL MATERIAL, CAPACITOR AND BATTERY FORMED OF THE MATERIAL AND METHOD OF PRODUCING THE MATERIAL AND THE CAPACITOR AND BATTERY

(75) Inventors: Seiji Nonaka, Ibaraki (JP); Masakazu Tanahashi, Osaka (JP); Mikinari Shimada, Yawata (JP); Tamao Kojima, Suita (JP); Munehiro Tabata, Ibaraki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/035,164

(22) Filed: Jan. 4, 2002

(65) Prior Publication Data

US 2002/0080558 A1 Jun. 27, 2002

Related U.S. Application Data

(60) Division of application No. 09/679,308, filed on Oct. 6, 2000, which is a continuation-in-part of application No. 09/381,680, filed as application No. PCT/JP99/00228 on Jan. 22, 1999, now abandoned.

(30) Foreign Application Priority Data

| Jan. 23, 1998 | (JP) | 10-011077 |
| Jan. 23, 1998 | (JP) | 10-011078 |
| Oct. 7, 1998 | (JP) | 11-286520 |
| Apr. 14, 2000 | (JP) | 2000-113776 |

(51) Int. Cl.$^7$ ................................. H01G 9/00

(52) U.S. Cl. ................ 361/502; 361/503; 361/508

(58) Field of Search ................ 361/502, 503, 361/508, 509, 510, 511, 512, 516, 517, 518, 519, 520, 521, 522

(56) References Cited

U.S. PATENT DOCUMENTS

| 5,150,283 | A | 9/1992 | Yoshida et al. |
| 6,191,935 | B1 * | 2/2001 | Okamura et al. .......... 29/25.03 |
| 6,222,720 | B1 * | 4/2001 | Aoki et al. .............. 361/301.1 |

FOREIGN PATENT DOCUMENTS

| JP | 52-26466 | 2/1977 |
| JP | 60-235419 | 11/1985 |
| JP | 64-9611 | 1/1989 |
| JP | 2-186615 | 7/1990 |
| JP | 3-73426 | 7/1991 |
| JP | 6-342739 | 12/1994 |
| JP | 7-320987 | 12/1995 |
| JP | 9-134726 | 5/1997 |
| JP | 11121301 | 4/1999 |

* cited by examiner

Primary Examiner—Anthony Dinkins
Assistant Examiner—Eric Thomas
(74) Attorney, Agent, or Firm—Wenderoth, Lind & Ponack, L.L.P.

(57) ABSTRACT

The present invention relates to an electrode metal material for batteries, capacitors, etc., used in contact with non-aqueous electrolyte, and particularly to a capacitor formed of the electrode metal material, and provides a valve metal material capable of decreasing the internal resistance of the capacitor. The electrode metal material includes a valve metal material and numerous carbon particles included in the surface of the valve metal material. The carbon particles are further fixed in the surface of the valve metal material so as to expose to the surface. The electrode metal material is coated with an activated carbon layer and used as a double-layer electrode for an electric double-layer capacitor. The carbon particles included in the surface ensure conduction between the activated carbon layer and the valve metal material. With this configuration, even if the surface of the valve metal material is oxidized, the internal resistance of the electrode is not decreased, the internal resistance of the capacitor is decreased, and the capacitance of the capacitor is increased.

11 Claims, 5 Drawing Sheets

ELECTRODE METAL MATERIAL, CAPACITOR AND BATTERY FORMED OF THE MATERIAL AND METHOD OF PRODUCING THE MATERIAL AND THE CAPACITOR AND BATTERY

This application is a Divisional application of Ser. No. 09/679,308 filed on Oct. 6, 2000, which is a Continuation-In-Part application of Ser. No. 09/381,680 filed on Sep. 23, 1999, now abandoned, which is a 371 of PCT/JP99/00228 filed on Jan. 22, 1999.

FIELD OF THE INVENTION

The present invention relates to an electrode metal material for electrical components such as capacitors and batteries which are used in contact with electrolyte, to a capacitor and a battery formed of the electrode metal material, and to a method of producing the electrode metal material and the capacitor and battery thereof.

PRIOR ART

At present, there are, for example, electric double-layer capacitors and electrolytic capacitors available as electrical components which are used in contact with electrolyte. Such electric double-layer capacitors have been applied to large-capacitance capacitors chargeable at up to about 3 V, and used for backup power sources of microcomputers, memory devices, timers, and the like.

Typically, an electric double-layer capacitor comprises a pair of polarizable electrodes or double-layer electrodes disposed face-to-face via an insulating separator therebetween and immersed in electrolyte. The electrode is produced by applying an activated carbon layer on the surface of an electrode metal material made of a valve metal and used as a mechanical supporter and, at the same time, electric collector.

Some types of electric double-layer capacitors use an organic-solvent based electrolytic solution as electrolyte, such as a tetraethyl ammonium salt which is added to an organic solvent, such as propylene carbonate. The examples of conventional electric double-layer capacitors using organic-solvent based electrolyte include a type in which a pair of electric double-layer electrodes is wound and enclosed in a container, and another type in which a pair of double-layer electrodes is laminated or stacked, both types having been disclosed in U.S. Pat. No. 5,150,283.

In the case of the winding type of capacitors, as shown in FIG. 7, an electrode metal material 1 is formed of etched aluminum foil having a thickness of 20 to 50 $\mu$m, and a paste obtained from a powder mixture of activated carbon particles, a desired binder and a desired conductive agent is applied to the above-mentioned metal foil to form a film. This film, that is, an activated carbon layer 30 (a polarizable electrode) mainly consisting of activated carbon particles, is used to form an electric double-layer electrode 3.

A lead 6 is connected to each of the electrode metal materials 1 of the pair of electric double-layer electrodes 3 and 3, respectively. These electrodes 3 and 3 are disposed face-to-face with a separator 5 therebetween and wound like a coil. The electric double-layer electrodes is immersed in non-aqueous electrolyte under vacuum to impregnate the activated carbon layers 30 and the separators 5 with the electrolyte, then placed in an aluminum case 70, the opening 7 of the aluminum case 70 being sealed with a watertight packing 8. The electrolyte in the electric double-layer capacitor has used polypropylene carbonate as an organic solvent, and a tetraethyl ammonium salt as an electrolyte, for example.

Furthermore, in a button-type electric double-layer capacitor, schematically shown in FIGS. 9 and 10, activated carbon layers 30 are joined to disc-like sheets 1 made of a valve metal material, respectively, to form a pair of double-layer electrodes 3. The pair of double-layer electrodes 3 and 3 are disposed face-to-face via an insulating separator 5 therebetween, and accommodated in a metal container comprising two mating members. The valve metal material sheets of the two double-layer electrodes are joined to the inner surface sides of the bottom member 60 and the lid member 61 of the metal container. Both the bottom and lid members are joined to each other so as to be watertight by using an insulating ring packing 69 at the peripheral portion thereof. The interior of the capacitor is filled with non-aqueous electrolyte so that the double-layer electrodes and the activated carbon layers are immersed therein sufficiently. The non-aqueous electrolyte is a solution of tetraethyl ammonium perchlorate added in propylene carbonate in the same way as described above.

An electrolytic capacitor is known as a capacitor in which non-aqueous electrolyte is used. In the anode of the capacitor, a dielectric film is formed by chemically treating the valve metal foil. In the cathode, the valve metal foil is used as it is. Usually, both the electrodes are disposed face-to-face, wound into a coil, and hermetically enclosed in a container while being immersed in electrolyte.

In the case of the conventional electric double-layer capacitor, the valve metal sheet or foil, on which a polarizable electrode is formed as a film, has a naturally oxidized film specific to the valve metal constituting an electrode structure while the foil is handled. When this foil is used to form an electrode structure, a thin, insulating oxidized film 4 is frequently formed at the interface between the aluminum foil 1 used as a valve metal material and the polarizable electrode 3, as schematically shown in FIG. 6.

Furthermore, the above-mentioned non-aqueous electrolyte typically includes slight amounts of water and oxygen. For this reason, the valve metal material constituting the electrode structure reacts with the water content in the electrolyte during use of the capacitor, and the surface of the metal is oxidized. Therefore, when the electric double-layer capacitor formed of this kind of metal is used for extended periods of time, its equivalent series resistance (ESR), i.e., the internal resistance of the capacitor used as a power source, increases gradually, and, in some cases, its capacitance decreases.

This problem due to the oxidation of the metal portion of the electrode has also occurred in the case of the button-type electric double-layer capacitor in the same way.

Furthermore, the anode of the electrolytic capacitor using non-aqueous electrolyte is provided with a dielectric insulating layer formed by anodizing a valve metal such as aluminum. In addition, its cathode in direct contact with the electrolyte is also formed of the valve metal such as aluminum. In this case, an oxide film is formed on the surface of the metal used for the cathode because of oxidation with the water content in the electrolyte. This causes a problem of the capacitor increasing in internal resistance, just like the problem described above.

With respect to batteries using electrodes in contact to non-aqueous electrolyte, a lithium ion secondary battery is known which has high charge-discharge cycle performance with high energy density in a compact shape.

A lithium ion secondary battery, as shown in FIG. 11, comprises a positive electrode 35, a negative electrode 37, facing to the positive electrode, a film separator 5 for separating both electrodes 35 and 37, and a non-aqueous electrolytic solution in which both the electrodes are placed and contained in a casing 71. The positive electrode 35 is, as an example, formed of a mixture of positive active substance such as $LiCoO_2$, conductive material such as acetylene black, and a binder including carboxylmethylcellulose and polyflorovinylidene which mixture is applied on both sides of aluminum foil as an electrode metal material 1 for an electric collector. On the other hand, the negative electrode 37 is formed of a mixture of negative active substance such as graphite and a binder such as carboxylmethylcellulose and styrene-butadiene rubber which mixture is applied on both sides of copper foil as an electric collector. The electrolytic solution is a non-aqueous solvent of a mixture of propylenecarbonate and 1,2-dimethoxyethane containing $LiPF_6$ as electrolyte. A porous polypropylene film is used as a separator.

In conventional lithium ion secondary batteries, aluminum foil is formed with natural oxide film on its surface during dealing with the foil so that thin isolating film have often been formed in the interface between the aluminum foil and the positive electrode on the aluminum foil.

Further, since the above non-aqueous electrolytic solution also contains slight amount of water and oxygen, the aluminum foil in the battery have been oxidized on its surface, in use, gradually over long time due to reaction of aluminum surface with water in the electrolytic solution, causing a lithium ion secondary battery to increase in equivalent series resistance, i.e., internal resistance and resulting in low capacity at high discharge rate.

SUMMARY OF THE INVENTION

Accordingly, an object of the present invention is provide a valve metal material capable of being formed into electrodes used in contact with non-aqueous electrolyte to reduce internal resistance of a capacitor or battery.

Another object of the present invention is to provide a method of producing a valve metal material capable of being formed into electrodes used in contact with non-aqueous electrolyte to reduce internal resistance of such a capacitor or battery.

A still another object of the present invention is to provide a capacitor capable of having a low internal resistance by restricting the change in the resistance of the electrode metal material constituting the electrodes used in contact with non-aqueous electrolyte.

A still another object of the present invention is to provide a non-aqueous secondary battery having low internal resistance by restricting the change in the resistance of the electrode metal material constituting the electrodes used in contact with non-aqueous electrolyte.

A yet still another object of the present invention is to provide a method of producing a capacitor capable of having a low internal resistance by restricting the change in the resistance of the electrode metal material constituting the electrodes used in contact with non-aqueous electrolyte.

A yet still another object of the present invention is to provide a method of producing a non-aqueous secondary battery having low internal resistance by restricting the change in the resistance of the electrode metal material constituting the electrodes used in contact with non-aqueous electrolyte.

An electrode metal material in accordance with the present invention is formed of a valve metal material containing carbon particles on the surface, and is used to form electrodes. The carbon particles in the carbon-containing metal material ensure direct contact with a conductor (including electrolyte) to electrically connect the electrode metal material to the conductor.

In particular, the carbon-containing metal material comprises a valve metal material and numerous carbon particles fixed in the surface of the valve metal material and exposed to the surface. In the present invention, the carbon particles may be projected slightly so as to be exposed to the surface of the valve metal material in order to enhance the conductivity and joining characteristic to a conductor to become contact therewith.

The electrode metal material in accordance with the present invention may be used to obtain electrode structures used in contact with non-aqueous electrolyte. This kind of carbon-containing metal material itself may be an electrode making contact with electrolyte. Alternatively, the electrode metal material may have an activated carbon layer coated on the surface, i.e., a polarizable electrode. The former corresponds to the cathode of an electrolytic capacitor, and the latter corresponds to the double-layer electrode of an electric double-layer capacitor.

Further, the electrode metal material may be used to support a positive electrode including a positive active substance on the surface of the electrode metal material, the positive electrode being used for a non-aqueous electrolytic secondary battery, e.g., a lithium ion secondary battery.

In the electrolytic capacitor, the carbon particles of the carbon-containing metal material, exposed to the surface thereof, can make direct contact with the electrolyte to ensure conductivity between the metal material and the electrolyte. In addition, inside the electric double-layer capacitor, the carbon particles of the carbon-containing metal material, exposed to the surface thereof, can make direct contact with the activated carbon layer to ensure conductivity between the metal material and the activated carbon layer. Further, in the lithium ion secondary battery, the carbon particles of the carbon-containing metal material are exposed to the surface thereof, to make direct contact with the active substances in the positive electrode, ensuring conductivity between the electrode metal material and the positive electrode.

In any of the cases, even if the carbon-containing metal material makes contact with electrolyte solution, and the metallic surface thereof is oxidized by water contained in non-aqueous electrolyte, the conductivity noted above remains almost unchanged over long time periods.

More particularly, numerous carbon particles may project on the surface of the valve metal material. Therefore, it is preferable that only the metal surface of the valve metal material may be removed such that the carbon particles are left projected on the removed surface. This projection configuration of the surface of the valve metal material ensures conductivity to the activated carbon layer in the capacitor or active substance in the battery, and also enhances strength of joining to the activated carbon layer or positive electrode.

More particularly, the metallic surface of the valve metal material may be coated with a passive film. In this case although the metallic surface of the valve metal material itself may lose conductivity, the metallic surface is prevented stably from oxidation because of no contact with the electrolyte, and the valve material has stable conductivity via the carbon particles for extended periods of time.

The valve metal material in accordance with the present invention can be formed into sheet. The term "sheet" herein refers to plate, sheet, film and foil. The valve metal material may be formed of products other than sheet, having a small thickness with a desired shape. The electrode metal material may have a shape of net or punched plate. this may be is adequate to apply, for example, the positive electrode thereon to produce non-aqueous secondary battery.

The sheet and other formed products may include carbon particles at least on one side thereof and also may include carbon particles on both sides thereof.

A method of producing a valve metal material for electrodes in accordance with the present invention contains driving or squeezing numerous carbon particles into the surface thereof. Pressing using dies or rolling using rollers may be employed to drive powder of carbon particles into a valve metal sheet, then, carbon particles being fixed in the surface of the valve metal sheet with the particle exposed on the surface.

Another method may be adopted where a slurry of carbon particles is applied and dispersed on a surface of a valve metal material and pressed to squeeze the carbon particles into the surface, then, obtaining carbon-containing electrode metal material. The carbon slurry may comprise carbon particles and a solvent, particularly, volatile dispersing liquid without any binder used. The dispersing liquid may be water, alcohol or other volatile liquid because after drying, it is preferable that only carbon particles remain dispersed on the surface without containing any impurity such as binder solid.

Prior to pressing in the above methods, the valve metal material may preferably be roughened on the surface, particularly be made porous in a thin layer of the surface, facilitating carbon particles to engage and embed in the porous surface layer effectively.

Also, a method of producing the valve metal material for electrodes in accordance with the present invention may include a step wherein the powder material for the valve metal and carbon particles are semi-melted in a mixture condition and subjected to pressure so as to be formed into a dense metal ingot. The metal ingot, including carbon particles dispersed inside, is forged or rolled into a product having a desired shape, and then the carbon particles are exposed to the surface of the product.

BRIEF DESCRIPTION OF THE DRAWINGS

The present invention will be described below in detail referring to the accompanying drawings, in which.

DETAILED DESCRIPTION OF THE INVENTION

Figure 1:
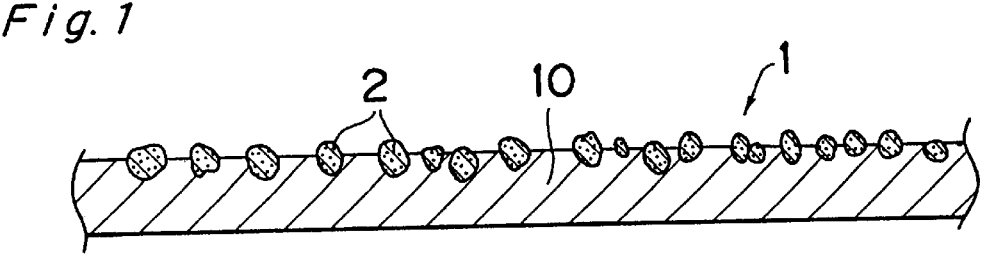
FIG. 1 is a schematic sectional view showing an example of a carbon-containing valve metal material in accordance with the present invention, wherein carbon particles are fixed in the surface of the valve metal sheet.

A valve metal material for electrodes in accordance with the present invention includes carbon particles fixed on the surface thereof as described above. The valve metals can be selected from among metals capable of forming a passivated layer on the surface thereof. For example, such valve metals may include tantalum, aluminum, titanium, niobium, zirconium, bismuth, silicon and hafnium. Alternatively, the valve metal can be selected from among alloys including these elements capable of generating a valve action, such as for example, a titanium-based alloy including boron and tin, a titanium-based alloy including chromium and vanadium, a titanium-based alloy including vanadium and antimony, and an aluminum-based alloy including titanium. The most desirable material is aluminum, in particular, high-purity aluminum.

The electrode metal material of the present invention is formed into the form having a desired thickness, for example, into sheet. The thickness of the sheet may be in a range of 10 $\mu$m to 5 mm, although the thickness depends on the kind of capacitor or battery, or the kind of electrode. Generally, for winding type electric double-layer capacitors and electrolytic capacitors, metal foil having a thickness of 50 to 500 $\mu$m is preferably used to provide flexibility and sufficient winding turns. On the other hand, for button-type electric double-layer capacitors, the valve metal material, when also used as a part of the wall or bottom portion of the container, should preferably have a larger thickness of about 0.50 to 3.0 mm, for example, to provide strength to the wall or bottom portion.

A base metal plate for providing strength may be cladded with the above-mentioned thin valve metal material, and carbon particles may be included in the clad valve metal material used. A highly corrosion-resistant metal or alloy, such as nickel or stainless steel, may be used as this kind of base metal. Such base metal plate cladded with valve metal material may used for a casing which also supports a positive electrode of button- or coin-type secondary batteries.

On the other hand, carbon particles are formed of conductive carbon particles, such as graphite or carbon black. Carbon black as an example may be acetylene black. Furthermore, carbon particles may be particles of activated carbon.

The diameter of carbon particles should preferably be in the range of 0.01 to 50 $\mu$m, more preferably, in the range of 0.1 to 10 µm. In addition, the carbon particles can have one of particulate, granular and fibrous forms. In the case of fibrous carbon particles, the above-mentioned particle diameter in the range of 0.1 to 50 µm refers to the fiber length thereof.

The content of carbon particles should preferably be in a range of 1 to 90% of the area percentage of the carbon with respect to the whole surface area of the valve metal material. If the area percentage of the carbon is less than 1%, it may be difficult to sufficiently reduce contact resistance at the surface. The area percentage of the carbon should preferably be higher. However, if the area percentage of the carbon is more than 90%, it becomes difficult to stably hold carbon particles pressed into the surface of the valve metal by a press method. Accordingly, the area percentage of the carbon particles on the surface should preferably be in a range of 5 to 60%, more preferably, in a range of 10 to 40%.

The valve metal material should preferably have a rough surface. In particular, carbon particles should preferably project slightly from the surface of the metal material. The projection of the carbon particles can be performed by subjecting the surface to electrolytic etching in an acidic aqueous solution. The exposure of numerous carbon particles can increase contact frequency to an activated carbon layer for an electric double-layer electrode structure. Furthermore, the activated carbon layer can be firmly fixed by an anchor effect. Also, the exposed carbon particles from the electrode can increase contact frequency to active substance contained in the positive electrode of non-aqueous secondary batteries.

FIG. 1 shows a carbon-driven metal material 1 wherein nearly particulate carbon particles 2 are driven on one side of a sheet of valve metal material 10. This figure shows a schematic view of an example of the valve metal material in which the carbon particles 2 are partially embedded in the surface of the metal material and the upper portions thereof project from the surface.

Figure 2:
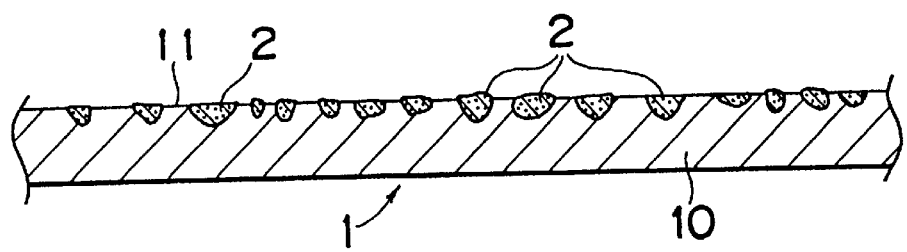
FIG. 2 is a schematic sectional view showing another example of a carbon-containing valve metal material in accordance with the present invention.

FIG. 2, similar to FIG. 1, is a conceptual view showing a condition wherein the carbon particles 2 are crushed and wholly embedded in the surface of the metal material. However, in the carbon-driven metal material 1, the surfaces of the carbon particles are still exposed to the surface of the metal material, and the carbon particles can be used to ensure conductivity. This condition may be obtained when relatively soft carbon particles are pressed strongly.

Figure 3:
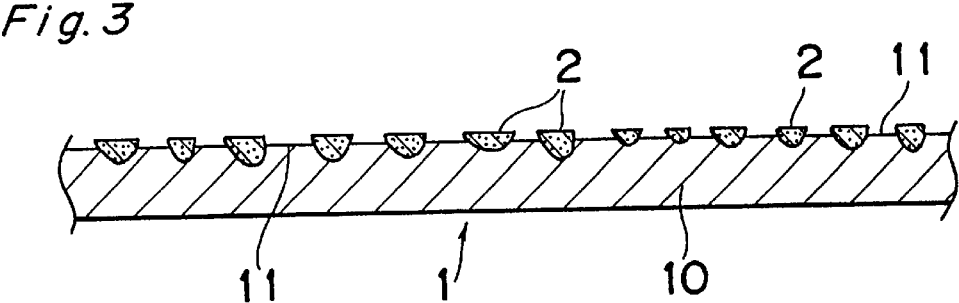
FIG. 3 is a schematic sectional view showing still another example of a carbon-containing valve metal material in accordance with the present invention.
Figure 4:
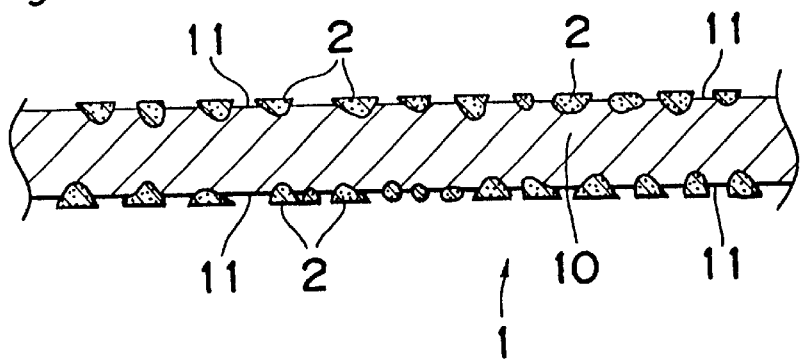
FIG. 4 is a schematic sectional view showing yet still another example of a carbon-containing valve metal material in accordance with the present invention, wherein carbon particles are fixed on both sides of the valve metal sheet.

FIG. 3 is a view showing a condition wherein the carbon-driven metal material 1 shown in FIG. 2 is subjected to electrolytic etching to remove its metallic surface 11, thereby allowing the carbon particles to project from a etched surface. FIG. 4 is a view showing a condition wherein the carbon particles driven on both sides of the sheet of the valve metal material which sides are subjected to etching, thereby allowing the carbon particles to project from both etched surfaces.

Furthermore, the whole surface of the carbon-containing metal material may be roughened by blasting. Blasting makes the surface of the valve metal material rough directly, and the carbon particles expose. In addition, for electric double layer capacitors, the activated carbon layer can be fixed firmly to the roughened surface, and the contact resistance of the surface can be reduced.

A passive film my preferably be formed on the surface of the carbon-containing metal material (for example, the metallic surface 11 shown in FIGS. 3 and 4). Even if water is present in electrolyte while the valve metal material is used as an electrode, the passive film protects the surface of the valve metal material against oxidation and corrosion. Therefore, the electrodes can be stabilized further, without adversely affecting the conductivity thereof due to the existence of the carbon particles.

The passive film may have only a thickness capable of withstanding working voltage of a capacitor comprising the film. For example, in the case of an electric double-layer capacitor rated at 2.5V to 3.5V, the film should only have a thickness capable of withstanding a voltage in the range of 4 to 5 V. In this case, the valve metal material is provided with a passive film having a thickness of 40 Å to 60 Å or more. Also, for the positive active electrode of non-aqueous secondary batteries, the passive film formed on the carbon containing electrode metal material may have higher withstand voltage than 3V, preferably of 4 to 5V.

Figure 11:
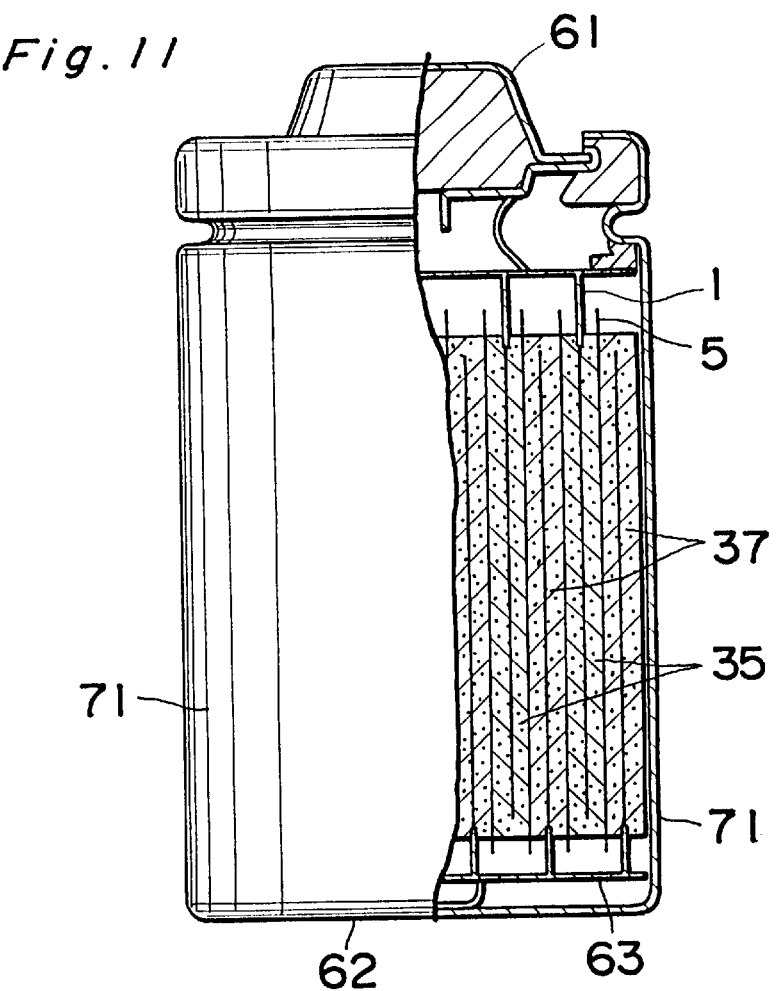
FIG. 11 shows a schematic partial cross sectional view of a non-aqueous secondary battery.

With respect to lithium ion secondary batteries, FIG. 11 shows a winding-type lithium ion secondary battery, in which a pair of electrodes i.e., a positive electrode 35 and a negative electrode 37, between which a separator 5 is inserted, are wound, penetrated with an non-aqueous electrolyte in a casing 71 for sealing.

An electrode metal material of the present invention is used to form the positive electrode 35 which comprise an mixture of positive active substance, conductive material and a binder which is formed on both sides of the electrode metal material. The positive active substance may be a compound capable of absorbing and emitting any ions of $H^+$, $Li^+$, $Na^+$ and $K^+$, preferably, oxides or chalcogenides of transition metals, or carbon, particularly, lithium-containing transition metal oxides. The transition metal may be one or more selected from a group of Co, Ni, Fe, V and Mn. A conductive material may be an electron-conductive material not to chemically react in the battery, such as natural graphite, synthetic graphite, carbon black, acetylene black or carbon fibers. As a binder, polysaccharides, thermo-plastic resins or rubber-like elastic polymers may be used. A binder may include starch, polyvinylalcohol, carboxylmethylcellulose, hydroxy-propylcellulose, polyflorovinylidene, etc.

An electrolyte comprises an organic solvent and a salt soluble to the solvent to dissociate. A solvent may be one or a mixture of propylene carbonate, ethylene carbonate, tetrahydrofuran, 2-methyltetrahydrofuran, γ-butyrolactone, and 1,2-dimethoxyethane. The salt as an electrolytic substance may be selected from $LiPF_6$, $LiClO_4$, $LiBF_4$ and $LiCF_3SO_3$.

The separator 5 may be thin insulating material capable of penetrating an electrolyte therethrough such as polypropylene porous film, woven or unwoven glass cloth, paper made of manila paper and rayon.

Figure 12:
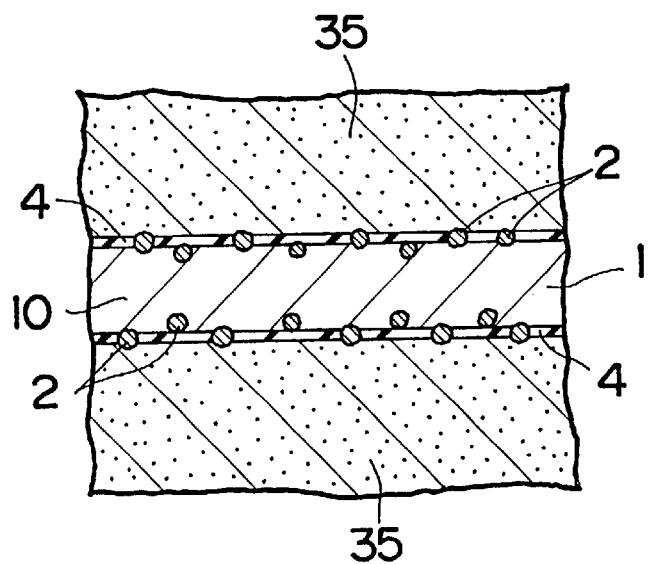
FIG. 12 shows a cross sectional structure of a positive electrode for a non-aqueous secondary battery which is formed on both sides of an carbon containing electrode metal material according to the present invention.

In this battery structure, FIG. 12 shows a cross sectional structure of a positive electrode 35 for a non-aqueous secondary battery which is formed on both sides of an carbon containing electrode metal material 1 according to the present invention. Since the electrode metal material 1 of the present invention which supports the positive electrodes 35 is provided with carbon particles on its surface, the carbon particles 2 can effectively connect the electrode metal material 1 of a valve metal 10 directly with a positive electrode 35 effectively even though a thin insulating film 4 has been formed in interfaces between the metallic surface of the electrode metal material 1 and the positive electrode 35 by oxidation of the metallic surface of the electrode material metal. This results in reduction in equivalent series resistance and capacity loss of batteries.

Some methods may be adopted to produce an electrode metal material formed of a valve metal material containing numerous carbon particles at least in the surface thereof.

In a first method, a mixture of valve metal powder and carbon powder is heated near its melting point and pressurized in a container to make an ingot so that the carbon powder may be contained in the valve metal ingot. This method further includes a step of subjecting the ingot of carbon-containing valve metal produced by the above step to plastic working in order to obtain a desired shape of the valve metal material. In the plastic working step, hot or cold forging or rolling can be utilized, whereby forming sheet or foil having a desired thickness or a formed product having any other shapes.

A second method includes a carbon-powder driving step wherein carbon particles are driven into the surface of a valve metal material by pressurizing carbon particles dispersed on the surface of the valve metal material.

The carbon particle driving step in the second method can also be accomplished by a press technique where dies are used to press and fit carbon particles into the surface of the valve metal material. The dies may have a flat, hardened plate or the like.

Furthermore, the carbon particle driving step can also be accomplished by a rolling method wherein rollers are used to drive carbon particles into the surface of the valve metal material. In either of the two methods, carbon particles can be pressed and fitted in the surface of the valve metal material and fixed.

By using the second method, carbon particles are driven in the surface of the valve metal material having a desired thickness. The above-mentioned carbon particle driving step can be performed by applying a surface pressure of 0.5 to 10000 kg/cm$^2$ in a direction perpendicular to the surface of the metal material. This pressure is determined depending on the hardness of the surface of the valve metal material and the hardness and particle size of the carbon particles.

Furthermore, the carbon particle driving step may also be used as a step of pressing or forging a valve metal blank into a formed product having a desired shape. In other words, in this case, the carbon particle driving step is carried out when the valve metal ingot is hot or cold worked. In this step, just when the valve metal material is pressurized by hot or cold forging or rolling, the carbon particles are driven into the forged or rolled surface.

Prior to the carbon particle driving step, numerous carbon particles are dispersed on the surface of a valve metal material, for example, in the form foil, sheet or plate. Usually, carbon powder may be powdered on the surface.

Preferably, a slurry containing carbon particles and liquid may be applied on a surface of a valve metal material, facilitate the dispersing Of carbon particles. The liquid in the slurry may be a volatile dispersing liquid to facilitate dehydration of the slurry. The slurry may not contain a binder which remain in a powder after drying. The dispersing liquid may be water, alcohol or other volatile liquid because after drying, it is preferable that only carbon particles remain dispersed on the surface without containing any impurity such as binder solid. Preferably, the carbon slurry may be dried on the surface of the valve metal material, and in the carbon particle driving step, is pressed to squeeze the carbon particles into the surface, obtaining carbon-containing electrode metal material.

Prior to pressing in the above methods, the valve metal material may preferably be roughened on the surface, allowing carbon particles to engage and embed easily on the rough surface.

A technique for roughening a surface includes blasting sand or other harden powder onto the surface. Other roughening method includes chemical or electrolytic etching which makes the surface porous in a thin layer under the valve metal surface. By this etching, a great number of pores are produced opening to the surface of the valve metal material and extending in some depth under the surface and dispersed uniformly in an area of the surface.

Such a roughened or porous surface may easily receive and hold the applied carbon powder or dried carbon slurry on the surface, preventing the carbon particles to be sent flying. Roughening of a valve metal surface can eliminate the need for use of any binder mixing in the carbon slurry, avoiding impurity inclusion on the carbon embedded surface.

Particularly, the porous surface layer formed by etching is easy to be deformed by pressing or rolling on the surface, allowing carbon particles to be embedded easily in high carbon density into the surface-deformed layer from the porous surface layer during pressing or rolling.

The roller used in rolling may be an roller embossed on its surface. The embossed roller can make an embossed pattern on the carbon embedded surface at the same time during driving carbon particle driving.

Furthermore, in the method in accordance with the present invention, the surface of the carbon containing metal material may preferably be coarsened after the carbon particle driving step.

For this purpose, it is desired that, after the carbon particle driving step, the method includes a step of exposing the carbon particles to the surface by electrolytically etching in an acidic aqueous solution. By this treatment, the carbon particles exposed on the surface project from the surface and carbon particles slightly embedded below the surface also are exposed to the surface. The exposure of numerous carbon particles can increase the contact frequency of an activated carbon layer for an electric double-layer electrode structure. Furthermore, the activated carbon layer can be firmly fixed by an anchor effect.

After the carbon particle driving step, the method may include blasting as a step of exposing carbon particles to the surface. This blasting technique can also accomplish direct roughing of the surface and exposing of the carbon particles by blasting.

The production method may preferably include a step of forming a passive film on the metallic surface of the carbon containing metal material after the carbon particle exposing step. Formation of the passive film may use a technique of heating the carbon-containing metal material oxidized in an oxidative atmosphere, such as in air. The heat treating is performed at 300–620° C.

Alternatively, another method is used, wherein the carbon-containing metal material is anodized using anodic oxidation of a metallic surface of the valve metal.

The passive film should have a thickness capable of withstanding an applied voltage of 4 to 5 V in the case of an electric double-layer capacitor rated at 2.5 to 3.5 V, for example. In this case, the valve metal material is provided with a passive film having a thickness of 40 Å to 60 Å or more.

Capacitors in accordance with the present invention include electric double-layer capacitors and electrolytic capacitors. In both types of the capacitors, non-aqueous electrolyte is used, and the valve metal material thereof makes contact with the electrolyte.

Figure 7:
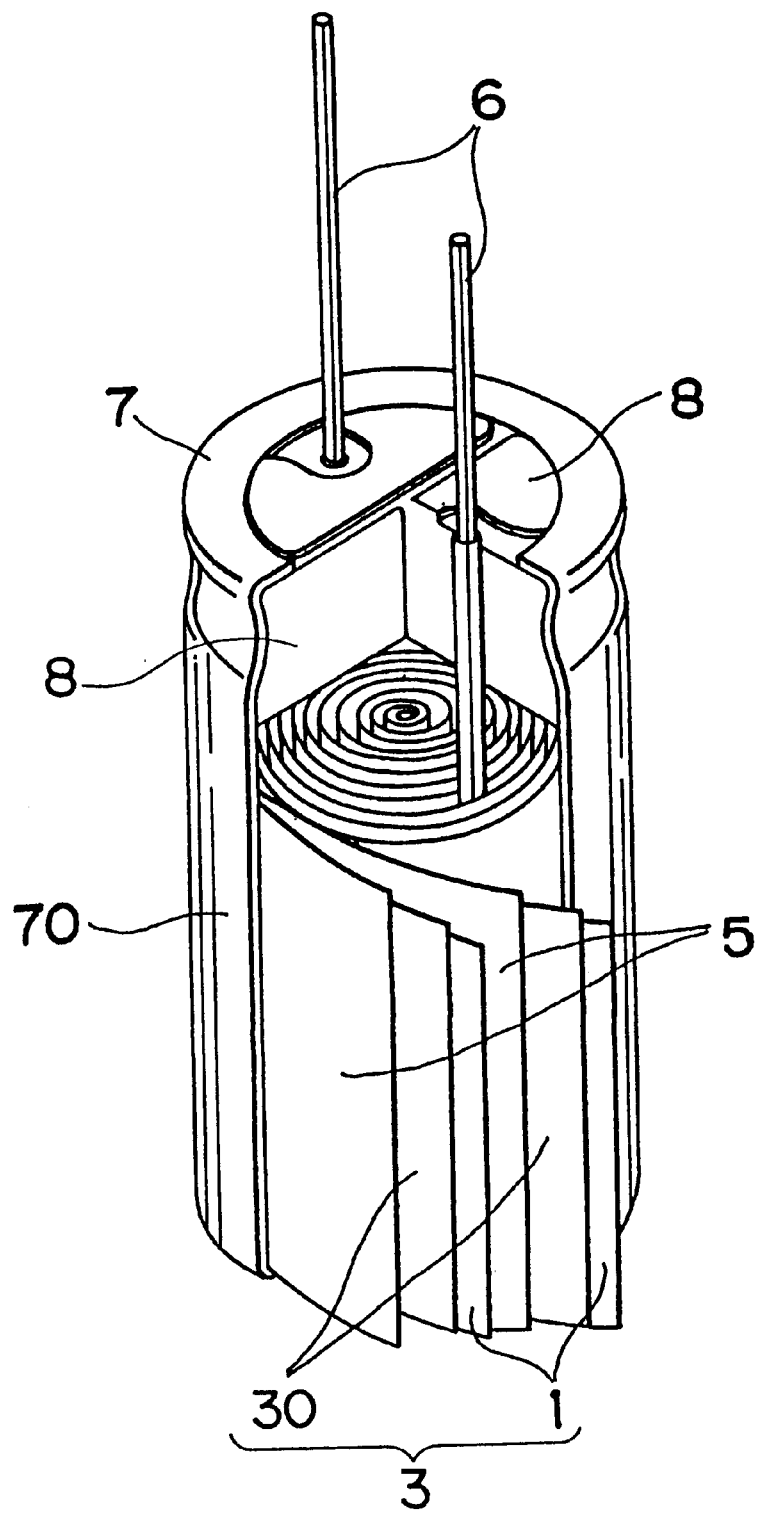
FIG. 7 is a schematic partially-cutaway perspective view showing a winding type electric double-layer capacitor.

FIG. 7 is a schematic view showing a winding type capacitor used as a kind of electric double-layer capacitor.

The winding type capacitor is provided with flexible electric double-layer electrodes. The electrode comprises thin valve metal foil used as a valve metal material, and activated carbon layers bonded to both sides of the foil. Numerous carbon particles are fixed on the surface of the foil so as to expose, thereby making contact with the activated carbon layers.

A pair of electric double-layer electrodes, holding a separator therebetween, is wound to a coil and enclosed in a container while being immersed in non-aqueous electrolyte, thereby forming an electric double-layer capacitor. The electrolyte is formed of an organic solvent not including water and a salt dissolved in such a solution so as to be dissociated. A solution wherein tetraethyl ammonium perchlorate used as an electrolyte is added to propylene carbonate used as a solvent is taken as an example.

The activated carbon layer is formed in a thin film by forming activated carbon powder into a paste form and by applying the paste to the surface of the valve metal foil.

The paste is obtained, for example, by kneading a mixture of activated carbon powder, conductive carbon powder and an appropriate binder, such as cellulose or fluororesin, as necessary, together with water or other solvent. The coated paste film is appropriately dried and heated together with the valve metal foil to cure the binder, whereby the film is fixed to obtain an electric double-layer electrode.

Leads are connected to the pair of electric double-layer electrodes, one lead to each electrode. Furthermore, the electrodes were wound while holding a separator therebetween so as to be formed into a coil. The separator is formed of an appropriate thin material that is insulating and water-permeable, such as glass-fiber woven or non-woven cloth.

The coil comprising the electric double-layer electrodes and the separator is immersed in electrolyte and accommodated in a metal container having a bottom. The opening of the container is sealed with a sealing material. The leads pass through the sealing material and are extended outside.

Figure 5:
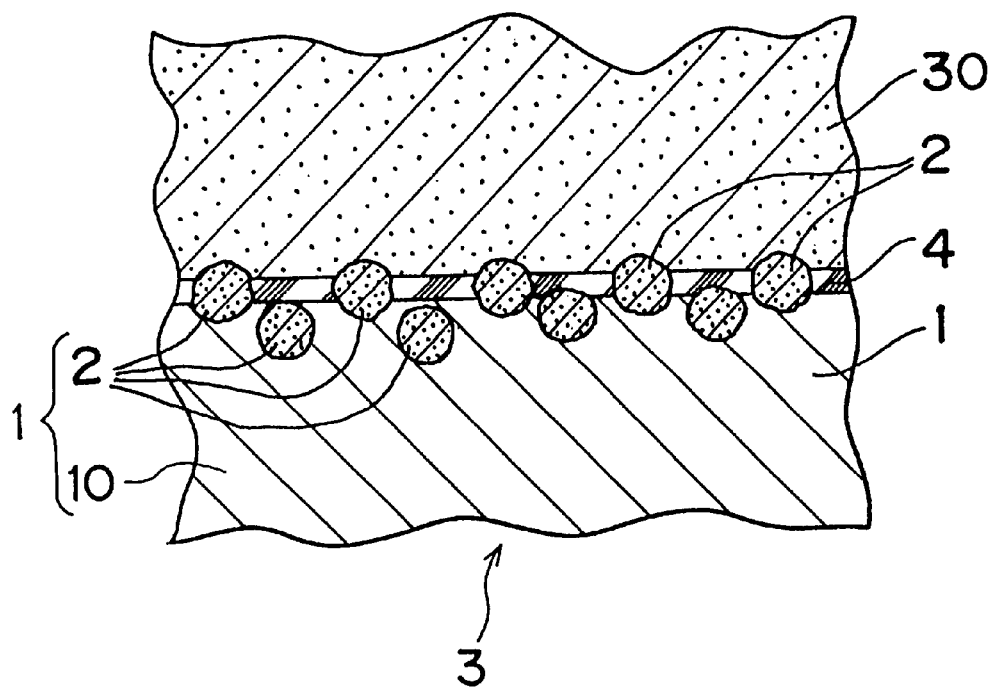
FIG. 5 is a schematic partially-sectional view showing a double-layer electrode used for an electric double-layer capacitor formed of the carbon-containing valve metal material in accordance with the present invention.
Figure 6:
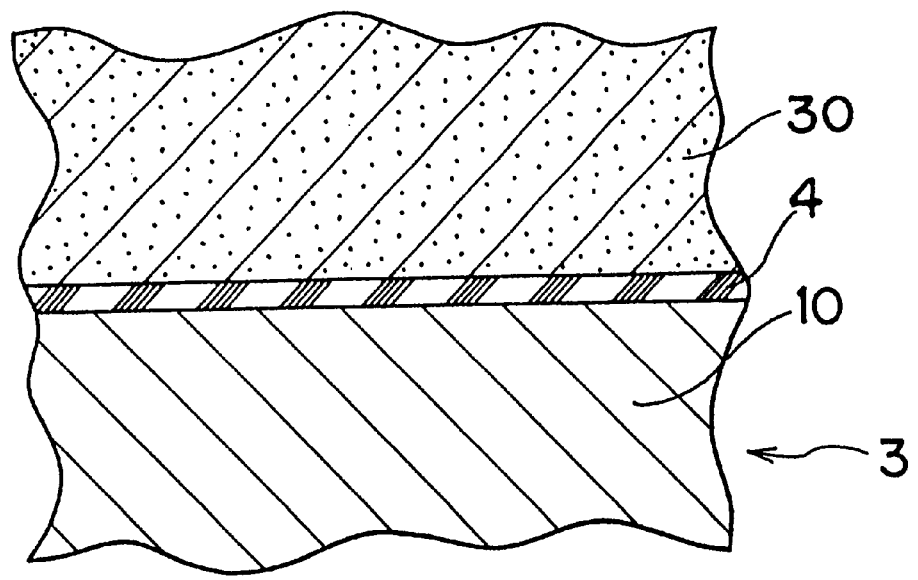
FIG. 6 is a schematic partially-sectional view showing a double-layer electrode used for a conventional electric double-layer capacitor.

With the above-mentioned structure of the electrode, even when a thin insulating film 4 is present at the interface between the foil-like metal material 10 of the electrode metal material 1 and the polarizable electrode 30 of the electric double-layer capacitor as shown in FIG. 5, no oxidized film is formed on the surfaces of carbon particles 2 exposed from the electrode foil 10. For this reason, electric conduction can be maintained by the carbon particles 2 at portions wherein the carbon particles 2 are present. As a result, the equivalent series resistance (ESR) of the electric double-layer capacitor decreases, and the conduction portions increase in number, whereby the capacitance thereof increases.

Figure 9:
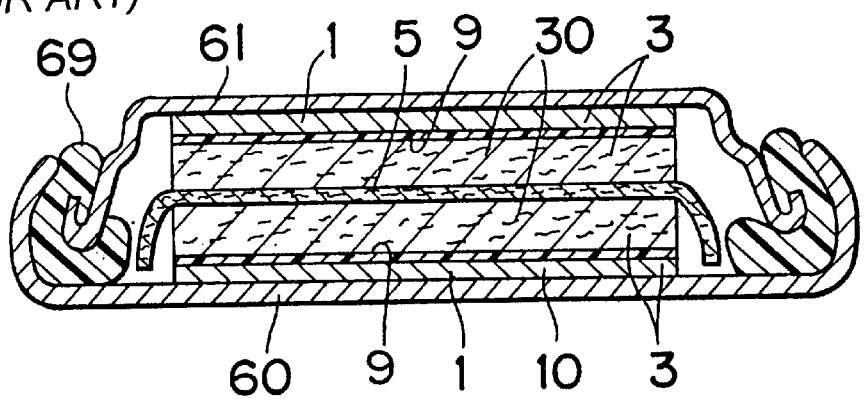
FIG. 9 is a schematic sectional view showing the button-type electric double-layer capacitor.
Figure 10:
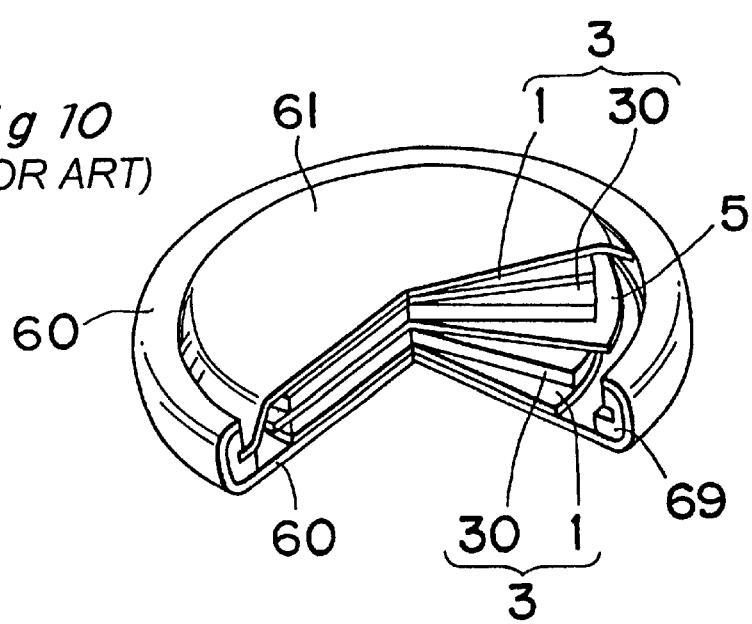
FIG. 10 is a schematic partially-cutaway perspective view showing the button-type electric double-layer capacitor.

FIGS. 9 and 10 show a button-type electric double-layer capacitor. An activated carbon layer 30 is bonded to a disc-like sheet 10 formed of the valve metal material of the present invention via an adhesive layer 9, thereby forming a pair of double-layer electrodes 3. The two double-layer electrodes 3 are disposed face-to-face with an insulating separator 5 therebetween, and accommodated inside a metal container comprising two mating portions 60 and 61.

The valve metal material sheets 10 and 10 of the two double-layer electrodes 3 and 3 are joined to the inner surface sides of the bottom portion 60 and the lid portion 61 of the metal container, respectively. The bottom portion and the lid portion are then joined to each other at their peripheral portions so as to be watertight via an insulating ring packing 69. The container is filled with non-aqueous electrolyte so that the double-layer electrodes and the activated carbon layers are sufficiently immersed in the electrolyte. The non-aqueous electrolyte may be, for example, a solution of tetraethyl ammonium perchlorate used as an electrolyte in propylene carbonate used as a solvent, as described above.

Figure 8:
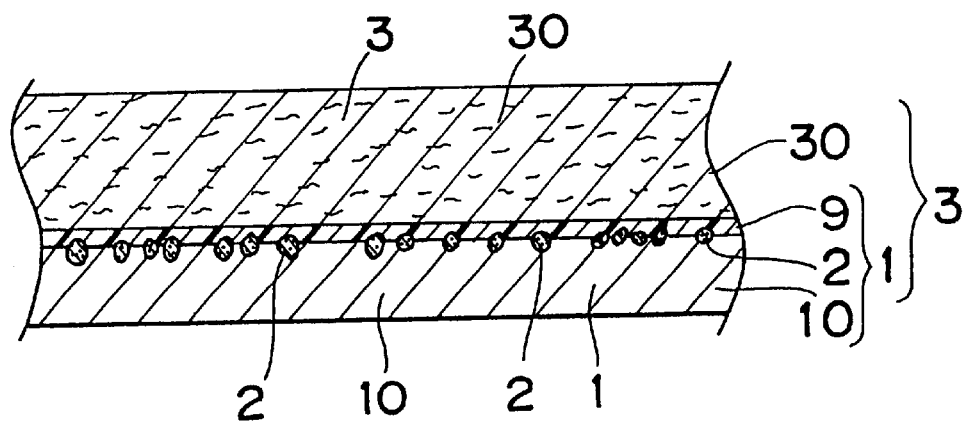
FIG. 8 is a schematic partially-sectional view showing a double-layer electrode used for a button-type electric double-layer capacitor formed of the carbon-containing valve metal material in accordance with the present invention.

Double-layer electrodes 3 for the button-type electric double-layer capacitor are shown in FIG. 8. The activated carbon layer 30, i.e., the polarizable electrode 30, is formed of a sheet made of activated carbon particles or fibers.

For example, the activated carbon layer 30 is obtained as described below. A paste is prepared by mixing activated carbon powder, a solvent and an appropriate binder, and this paste is formed into thin film, which are dried and cured to obtain sheets including activated carbon particles. The sheets are used as the activated carbon layer 30.

The sheet of activated carbon fiber is formed of fiber activated at the carbonization step of phenol-based resin fiber, for example. The activated carbon fiber is woven into a sheet.

The above-mentioned activated carbon particle sheet or the activated carbon fiber sheet is stamped into sheet pieces having a desired shape, and the sheet pieces are bonded to the carbon-containing side of the valve metal material sheet so as to be assembled into the double-layer electrode 3. An organic adhesive 9, being conductive, is usually used for the bonding.

The conductive adhesive may be used to firmly bond a sheet of chemically active carbon fiber or the like to the valve metal material sheet. Furthermore, the adhesive 9 is used to electrically connect the carbon particles on the valve metal material side to some parts of the fiber and particles on the activated carbon side. The carbon particles 2 on the valve metal material side ensures conductivity at the double-layer electrode 3 via the adhesive layer 9, thereby reducing the internal resistance of the capacitor used as a power source.

The present invention also includes a non-aqueous electrolytic capacitor having a cathode formed of the sheet of valve metal material. The anode of the electrolytic capacitor is formed of a valve metal sheet provided with an insulating, very thin, highly dielectric layer on the surface thereof. The cathode thereof is formed of a valve metal sheet including carbon particles on the surface thereof. Both the sheets of the anode and the cathode, disposed face-to-face, are wound or integrated, and they are accommodated in a container and immersed into electrolyte inside the container.

The electrolyte of this electrolytic capacitor is prepared by adding, for example, an appropriate inorganic or organic salt to an ethylene glycol-based solvent. Even if a small amount of water is present in the electrolyte, only the metallic surface of the valve metal material is oxidized, whereby the carbon particles hold contact with the electrolyte to ensure conductivity. For this reason, the electrolytic capacitor is far less likely to decrease in resistance, and the internal resistance thereof is far less likely to increase even after use for extended periods of time.

Embodiments

EXAMPLE 1

A valve metal was formed of high-purity aluminum foil of four-nine grades, having a thickness of 20 $\mu$m. An electrode metal material was produced as described below. Acetylene black particles having an average particle diameter of 2 $\mu$m were dispersed uniformly on the surface of the metal foil in an amount of 50% by weight with respect to the metal foil per unit area of the foil, and subjected to a line pressure of 100 kg/cm$^2$ in a direction perpendicular to the surface of the foil by using reduction rollers. As a result, carbon-embedded metal foil, wherein numerous carbon particles were driven in the surface of the aluminum foil, was obtained.

EXAMPLE 2

In the same way, an electrode metal material was produced as described below. Acetylene black particles having an average particle diameter of 2 μm were dispersed uniformly on the surface of high-purity aluminum foil of four-9 grade, having a thickness of 20 μm, at 50% by weight in the same way as described above, and subjected to a line pressure of 100 kg/cm$^2$ in a direction perpendicular to the surface of the foil by using rollers. Numerous carbon particles were thus driven in the surface of the aluminum foil. After this, the carbon-embedded metal foil was subjected to electrolytic etching in a nitric acid-based etching solution to expose the carbon particles to the surface.

EXAMPLE 3

In the same way, phenol-resin-based activated carbon particles having a particle diameter of 10 μm were dispersed uniformly on the surface of etched high-purity aluminum foil of four-9 grade, having a thickness of 20 μm, which is used as a valve metal material, and then subjected to a pressure of 100 kg/cm in a direction perpendicular to the surface of the foil by using reduction rollers. As a result, numerous carbon particles were driven in the surface of the aluminum foil. After this, the carbon-embedded metal foil was subjected to blasting to expose the carbon particles to the surface.

Electric double-layer capacitors were assembled by using these pieces of carbon-embedded metal foil for electrodes in accordance with Examples 1 to 3. To form a double-layer electrode, the carbon-embedded metal foil was coated with a paste including activated carbon particles. To prepare the paste, after obtaining a powder mixture of phenol-resin-based activated carbon particles having a particle diameter of 5 μm, an ammonium salt of carboxymethyl cellulose ($C_6H_9O_5CH_2CO_2NH_4$)$_n$ and acetylene black in a weight ratio of 60.2:2, methanol three times as much as the powder mixture and water five times as much as the powder mixture by weight were added to the powder mixture and kneaded. The electrode metal material foil was immersed in this paste for 15 seconds, whereby a film of the paste was formed on the metal foil 1. The foil was then dried for 1 hour at 100° C. in the air to form an activate d carbon layer (polarizable electrode). Next, the foil was cut and divided into two sheets, each having dimensions of 25×400 mm, thereby obtaining a pair of double-layer electrodes.

Next, aluminum leads 6 were connected to the double-layer electrodes, one lead to each electrode. The two double-layer electrodes were disposed face-to-face with a separator 5 therebetween, and then wound and formed into a coil. The coil was immersed into electrolyte wherein tetra ethyl ammonium perchlorate was added to propylene carbonate in a ratio of 0.5 mol/litter, and vacuuming was carried out, whereby the double-layer electrodes 3 and the separator 5 were impregnated with the electrolyte. The double-layer electrodes 3 and the separator 5 were then inserted into an aluminum case 7, and the case 7 was sealed with a packing, whereby an electric double-layer capacitor was obtained.

EXAMPLE 4

Just as in the case of Example 1, a valve metal material was formed by press-fitting carbon particles in the surface thereof. The valve metal material was electrolytically etched in a nitric-acid-based etching solution to expose the carbon particles to the surface thereof, and then subjected to oxidation at 400° C. for 2 minutes in the air.

Just as in the case of Example 1, an activated carbon layer was formed on the surface of the valve metal material to obtain a double-layer electrode. By using the electrodes, an electric double-layer capacitor was obtained.

EXAMPLE 5

Just as in the case of Example 3, a valve metal material was formed as described below. Phenol-resin-based activated carbon particles having a particle diameter of 10 μm were dispersed uniformly on aluminum foil having a thickness of 20 μm, and the foil was subjected to blasting to expose the carbon particles to the surface thereof.

To form double-layer electrodes, valve metal material foil was coated with a paste. To prepare the paste, after obtaining a powder mixture of phenol-resin-based activated carbon particles having a particle diameter of 5 μm, an ammonium salt of carboxymethyl cellulose and acetylene black in a weight ratio of 60.2:2, methanol three times as much as the powder mixture and water five times as much as the powder mixture by weight were added to the powder mixture and kneaded. The electrode metal material foil was immersed in the paste for 15 seconds, whereby a film of the paste was formed on the metal foil 1. After this, the foil was dried for 1 hour at 180° C. in the air to form an activated carbon layer (polarizable electrode). The foil was then cut to divide into two sheets, each having dimensions of 25×400 mm, thereby obtaining a pair of double-layer electrodes. Next, just as in the case of the above-mentioned examples, the double-layer electrodes were used to assemble an electric double-layer capacitor.

EXAMPLE 6

Just as in the case of Example 3, a valve metal material of aluminum foil with a thickness of 20 μm, on which phenol-resin-based activated carbon particles having a particle diameter of 10 μm were dispersed uniformly, was subjected to blasting to expose the carbon particles on the surface. Furthermore, this valve metal material was subjected to an oxidizing treatment at 400° C. for 2 minutes in the air.

The foil of the carbon-containing valve metal material obtained as described above was coated with a paste to form double-layer electrodes. The paste was prepared by kneading a powder mixture comprising phenol-resin-based activated carbon fiber having been cut to a length of 5 μm in the long-chain direction thereof, an ammonium salt of carboxymethylcellulose and acetylene black in a weight ratio of 60.2:2, respectively, together with methanol three times as much as the powder mixture and water five times as much as the powder mixture by weight added to the powder mixture. The electrode metal material foil was immersed in the paste for 15 seconds, whereby a film of the paste was applied on the metal foil 1. The foil was then dried for 1 hour at 180° C. in the air to form an activated carbon layer. The foil was then cut and divided into two sheets, each having dimensions of 25×400 mm, thereby obtaining a pair of double-layer electrodes. Next, just as in the case of the above-mentioned examples, an electric double-layer capacitor was obtained.

EXAMPLE 7

Just as in the case of Example 1, a valve metal material was obtained by using aluminum film having a thickness of 20 μm, on which phenol-resin-based activated carbon particles having a particle diameter of 10 μm were dispersed uniformly.

To prepare a mixture powder for a paste, a powder mixture of phenol-resin-based activated carbon fiber having been cut to a length of 5 μm in the long-chain direction thereof, an ammonium salt of carboxymethylcellulose and acetylene black in a weight ratio of 60.2:2 was used. To this powder mixture, methanol three times as much as the powder mixture and water five times as much as the powder mixture by weight were added in order to prepare a mixture solution in slurry form. A collector 1 was then immersed in the mixture solution for 15 seconds, whereby a polarizable electrode 3 was formed as a film on the collector 1. Next, the electrode was dried for 1 hour at 180° C. in the air, and the foil was cut and divided into two sheets, each having dimensions of 25×400 mm, thereby obtaining a pair of double-layer electrodes. Just as in the case of the above-mentioned examples, an electric double-layer capacitor was obtained.

Comparative Example

Electrode metal material foil was formed of high-purity aluminum foil of four-9 grade, having a thickness of 20 μm and not including carbon particles. This valve metal material was immersed in a water solution of 1.0 N hydrochloric acid, 6.0 N nitric acid and 4.0 N phosphoric acid. The aluminum foil was subjected to etching by applying direct current to the foil used as the anode. An electric double-layer capacitor was obtained just as in the case of Example 1.

The capacitors in accordance with these examples and the comparative example were charged at a constant voltage of 2.5 V for 1 hour. The capacitors were then discharged at a constant current of 100 mA, and the capacitance C and equivalent series resistance (ESR) values of the capacitors were measured. Furthermore, the capacitors were charged at a constant voltage of 2.8 V at 75° C. in a constant temperature bath, and maintained in these conditions for 3000 hours. They were then discharged at a constant current of 100 mA, and the capacitance C and equivalent series resistance (ESR) values were measured in the same way. Table 1 shows the results of the measurements.

TABLE 1

| | Surface treatment | C (F) | ΔC (%) | ESR (mΩ) | ΔESR (%) |
|---|---|---|---|---|---|
| Example 1 | Carbon-embedding | 27 | −16.1 | 55 | 16.5 |
| Example 2 | Carbon-embedding, etching | 42 | −5.5 | 28 | 4.0 |
| Example 3 | Carbon-embedding, blasting | 48 | — | 32 | — |
| Example 4 | Carbon-embedding, etching, oxidation | 40 | −3.0 | 30 | 2.5 |
| Example 5 | Carbon-embedding, blasting, oxidation | 48 | −6.2 | 32 | 4.5 |
| Example 6 | Carbon-embedding, blasting, oxidation | 45 | −3.0 | 34 | 2.8 |
| Example 7 | Carbon-embedding | 35 | −18.5 | 60 | 14.8 |
| Comparative | — | 20 | −27.5 | 80 | 22.0 |

The ΔC and ΔESR in Table 1 represent the change ratios of C and ESR from the initial C and ESR values to those obtained 3000 hours after treatments in the above-mentioned conditions, respectively.

As clearly disclosed in Table 1, it is understood that the capacitance values of the electric double-layer capacitors formed of the carbon-containing metal materials in accordance with the examples are larger than that of the comparative example, and that the ESR values of the former are smaller than that of the latter. This can be explained as follows: by using electrode foil to which carbon particles are added, the carbon particles are exposed to the surface of the electrode foil, whereby conductivity can be maintained at the interface between the electrode foil and the polarizable electrode. Furthermore, according to this table, it is found that the stability of capacitance and ESR with respect to time can be enhanced by making the surface of the carbon-containing metal material rough by carrying out etching or blasting, in particular, by carrying out oxidization to form a passive film.

A further embodiment of the invention is shown below with respect to use of carbon slurry in the method producing an electrode metal material.

EXAMPLE 8

Aluminum of four-nine grade having 20 μm thick, was etched to produce a great number of pores opening to the surface, and was used to apply a carbon slurry of formulation of 1 part of carbon particles, 2 parts of ethanol and 20 parts of water. In this Example, acetylene black of mean particle size of 0.2 μm was used as carbon particles. The aluminum foil is soaked into the slurry for 10 seconds to produce a slurry film on the surface, dried in air 30 minutes, and then rolled over the dried slurry by pressurizing at 100 kg/cm of line pressure, obtaining a carbon embedded metal sheet.

EXAMPLE 9

In this Example, activated carbon powder from phenol resin having 2 μm of mean particle size was used to produce carbon embedded metal sheet, but other conditions were similar to Example 8.

EXAMPLE 10

Part of the carbon embedded metal sheet from Example 8 was electrolytically etched in a nitrate etching solution to expose carbon particles on the surface and then oxidized by heating at 400° C. for 2 minutes in air.

EXAMPLE 11

Part of the carbon embedded metal sheet from Example 9 was blasted to expose carbon particles on the surface and then oxidized similarly to Example 10.

Comparative 2

A aluminum foil was used without applying carbon particles for an electrode metal material.

Comparative 3

A aluminum foil without applying carbon particles was oxidized by heating at 400° C. in air and used for a electrode metal material.

The carbon embedded metal sheets from these Examples 8–11 and the comparative sheets were provided for fabricating electric double-layer capacitors. The carbon embedded metal sheets were applied with an activated carbon past which was formed of a powder of activated carbon from phenol resin ammonium carboxylmethylcellulose and acetylene black by soaking and than dried, obtaining activated carbon laminate. the laminate was cut to two pieces of strips of 25 mm wide and 400 mm long as electric double layer electrodes. The two pieces of electrodes 3 and 5 were wound with a separator 5 to a coil, impregnated with an electrolyte containing tetraethyl ammonium perchlorate and propylene carbonate and contained in a casing 7, obtaining electric double layer capacitors.

The electric double layer capacitors were tested by charging at constant 2.5V for 1 hour and discharging 100 mA of current to measure dielectric capacitance and ESR. thereafter, The same capacitors were charged at constant 2.8V at 75° C. maintained 3000 hours, and discharged in constant 100 mA of current, and dielectric capacitance and ESR were measured. The results are shown in Table 2.

TABLE 2

| | Surface treatment | C (F) | ΔC (%) | ESR (mΩ) | ΔESR (%) |
|---|---|---|---|---|---|
| Example 8 | carbon slurry oxidation | 42 | −2.5 | 36 | 2.9 |
| Example 9 | carbon slurry oxidation | 40 | −3.0 | 38 | 3.5 |
| Example 10 | carbon slurry oxidation etching | 48 | −1.2 | 30 | 1.9 |
| Example 11 | carbon slurry oxidation blasting | 45 | −1.6 | 32 | 2.2 |
| Comparative 2 | no carbon-embedding, | 25 | −17.0 | 75 | 16.5 |
| Comparative 3 | No carbon-embedding, oxidation | 12 | −10.0 | 93 | 8.2 |

It is found from Table 2 that the capacitors using the carbon bedded metal material as supports for carbon electrodes are higher in capacitance and lower in ESR than Comparative examples using no carbon particles. Treatment of etching or blasting and particularly passivation of a metallic surface by oxidation are useful to increase Dielectric capacity and ESR stability.

A further embodiment of the invention is shown below with respect to application to lithium ion non-aqueous batteries.

EXAMPLE 12

Carbon-embedded metal foil having numerous carbon particles driven in the surface of the aluminum foil was obtained in the similar manner to Example 1, except that the acetylene black particles were dispersed in an amount of 30% by weight, aluminum foil having 50 μm. The carbon embedded alumina foil was electrolytically etched with a nitrate etchant to expose the carbon particles on the etched surface.

EXAMPLE 13

Part of the aluminum foil obtained in Example 12 was further anodized in an ammonium adipate solution applying 5 v to produce supporters for positive electrode.

EXAMPLE 14

Aluminum foil of four-nine grade having 10 μm was embedded with numerous carbon particles in a similar manner to Example 12, cladded onto both sides of a piece of stainless steel foil of 10 μm in thickness, and then, electrolytically etched with a nitrate solution expose the carbon particles from the etched surface.

EXAMPLE 15

Part of the carbon embedded aluminum foil obtained in Example 14 was anodized in the same way as Example 13 to produce supporters for positive electrode.

EXAMPLE 16

Aluminum foil of four-nine grade having thickness of 10 μm was clad with both surfaces of a piece of stainless steel foil and carbon particles were dispersed uniformly on the aluminum foil in an amount of 25% by weight with respect to a unit area of the aluminum foil and pressed with a line pressure of about 100 kg/cm by using rollers for a cold rolling mil, then being embedded into the both surfaces of the aluminum foil. The carbon embedded clad foil obtained was etched by using a nitrate solution etchant as noted above Example 14 to expose the carbon particles from the etched surfaces of the aluminum foils, producing a supporter for positive electrode.

EXAMPLE 17

Part of carbon embedded material of clad aluminum and stainless steel was anodized in ammonium adipate solution applying 5 v as shown in Example 15 to produce supporters for positive electrode.

The supporters from these Examples 12–17 were supplied to fabricate lithium ion secondary batteries, wherein a slurry was prepared containing 90% by weight of $LiCoO_2$ as positive active substance, 7% by weight of acetylene black as conductive material, and 1% by weight of carboxylmethylcellulose and 2% by weight of polyfluorovinylidene, and applied on both sides of the carbon embedded aluminum foil as a electrode metal material, and then, dried in air and pressed to make a positive electrode in thickness of 0.03 mm.

On the other hand, a negative electrode was produced of a slurry including 94% by weight of graphite, 2% by weight of carboxylmethylcellulose and 4% by weight of styrene-butadiene rubber which slurry was applied on both sides of copper foil, and then dried and pressed to 0.22 mm thickness.

To fabricating batteries of AA battery size as shown in FIG. 11, a sheet of the positive electrode 35 and a sheet of the negative electrode 37 prepared above were wound while stacking between which a separator 5 of polypropylene porous film was interposed, and placed in a can casing 71 with an electrolyte containing $LiPF_6$ in a mixture solvent. An inner bottom of the casing 71 was connected to the copper foil 63 to use for an outer negative terminal, and then an top opening of the casing was sealed with a metal cover 61 for using a positive terminal 61 which metal cover is connected to the electrode metal material 1 via leads, thus obtaining lithium ion secondary batteries having nominal capacity of 1800 mAh.

The batteries thus fabricated were tested to determine 2C and 0.2C capacitance after repeating 50 charges to 4.3V and discharges by 3.0V with a constant current of 100 mA in an incubator holding a temperature at 25° C. From these date, capacity retention of the tested batteries are evaluated and the results are shown in Table 4.

TABLE 3

| | Capacity Retention (%) | |
|---|---|---|
| | 0.2 C | 2 C |
| Example 12 | 90 | 58 |
| Example 13 | 95 | 63 |
| Example 14 | 88 | 55 |
| Example 15 | 94 | 61 |
| Example 16 | 85 | 53 |

TABLE 3-continued

| | Capacity Retention (%) | |
|---|---|---|
| | 0.2 C | 2 C |
| Example 17 | 92 | 60 |
| Comparative 4 | 48 | 12 |

In Comparative Example 4 in Table 3, conventional aluminum foil of four-nine grade having thickness of 20 μm, which had not embedded with carbon particles, was used as electrode metal material to support a positive electrode for the same battery.

It is seen from Table 2 that the batteries of these Examples 12–17 are higher in capacity retention, particularly, exhibit more excellent high-rate performance as compared to the battery of Comparative Example 4. This shows that carbon particles embedded in and exposed to the surface of the electrode metal material can increase conductivity between a positive electrode and a supporter using the electrode metal material for a positive electrode. Event though oxide film are gradually produced on the metallic surface of the electrode during the cycle test of repeating charges and discharges, conductivity due to carbon particles can be kept high to maintain high capacity retention of the battery. Also, passivation formed on a carbon embedded electrode metal material by anodizing is found to maintain stability of the high retention performance even after the cycling test.

The electrode metal material in accordance with the present invention is used to form a capacitor electrode structure making contact with electrolyte, and includes numerous carbon particles on the surface of the valve metal material. Therefore, electric connection can be ensured between a carbon electrode member, such as activated carbon particles, to which the electrode metal material is joined, and the electrolyte, whereby a stable electrode structure can be obtained. For this reason, the electrode function of this electrode metal material is not deteriorated even if the material is used in the presence of water in the electrolyte.

In addition, the carbon particles of the electrode metal material can be fixed in the surface of the valve metal material so as to be exposed to the surface, thereby enhancing electric connection and joining to the electrode members.

Furthermore, when the surface of the valve metal material of the electrode metal material is coated with a passive film, high conductivity to the electrode members and the electrolyte can be ensured stably for extended periods of time. The electrode metal material in accordance with the present invention is coated with an activated carbon layer, and can be used as the double-layer electrodes of an electric double-layer capacitor. Therefore, it is possible to attain an electric double-layer capacitor having a low internal resistance and a large capacitance value.

Moreover, the electrode metal material, making contact with electrolyte, is used as the cathode of an electrolytic capacitor, whereby it is possible to obtain a cathode having stable conductivity for extended periods of time. Therefore, it is possible to attain an electrolytic capacitor having a low internal resistance and a large capacitance value.

Industrial Usability

The electrode metal materials in accordance with the present invention can be produced in the fields of the metal industry and electronic component materials, and can be used as electrode materials for electric double-layer capacitors and electrolytic capacitors. Furthermore, the capacitors in accordance with the present invention can be widely produced and used as electronic components in the field of electronic component materials, and can be applied to a wide range of various electronic apparatuses.

What is claimed is:

1. A capacitor comprising a pair of electrodes and non-aqueous electrolyte, wherein at least one electrode includes an electrode metal material which is a carbon-containing metal material comprising a valve metal material and numerous carbon particles fixed in the surface of said valve metal material and exposed to said surface.

2. The capacitor according to claim 1, wherein said capacitor is an electric double-layer capacitor, and said pair of electrodes is formed of electric double-layer electrodes each comprising said carbon-containing metal material and an activated carbon layer formed in contact with said carbon particles on the surface of said metal material.

3. The capacitor according to claim 2, wherein said valve metal material is a flexible sheet, said pair of electric double-layer electrodes is disposed face-to-face with a separator therebetween and wound, and enclosed in a container to obtain a winding type electric double-layer capacitor.

4. The capacitor according to claim 2, wherein said activated carbon layers of said pair of electric double-layer electrodes are accommodated in a container with a separator therebetween, and said valve metal materials of said electrodes are accommodated in the metallic lid and bottom portions of a container, which are coupled so as to be insulated from each other.

5. The capacitor according to claim 4, wherein said metallic lid and bottom portions of said container are clad with said valve metal materials.

6. The capacitor according to claim 1, wherein said carbon particles are formed of conductive carbon particles.

7. The capacitor according to claim 6, wherein said conductive carbon particles are graphite or carbon black.

8. The capacitor according to claim 1, wherein said carbon particles are activated carbon particles.

9. The capacitor according to claim 1, wherein the diameter of said carbon particles is in the range of 0.01 to 50 μm.

10. The capacitor according to claim 1, wherein said carbon particles have one of particulate, granular and fibrous forms.

11. The capacitor according to claim 1, wherein a passive film is formed on the metallic surface of said valve metal material.

* * * * *

UNITED STATES PATENT AND TRADEMARK OFFICE
CERTIFICATE OF CORRECTION

PATENT NO. : 6,493,210 B2
DATED : December 10, 2002
INVENTOR(S) : Seiji Nonaka et al.

It is certified that error appears in the above-identified patent and that said Letters Patent is hereby corrected as shown below:

Title page,
Item [30], Foreign Application Priority Data, change "Oct. 7, 1998" to -- Oct. 7, 1999 --.

Signed and Sealed this

Fifteenth Day of March, 2005

JON W. DUDAS
*Director of the United States Patent and Trademark Office*